United States Patent
Shintani

[11] Patent Number: 5,956,187
[45] Date of Patent: Sep. 21, 1999

[54] LENS AND OPTICAL DEVICE PROVIDED WITH THE LENS

[75] Inventor: Dai Shintani, Kishiwada, Japan

[73] Assignee: Minolta Co., Ltd., Osaka, Japan

[21] Appl. No.: 09/060,061

[22] Filed: Apr. 14, 1998

[30] Foreign Application Priority Data

Apr. 15, 1997 [JP] Japan .................................. 9-097193

[51] Int. Cl.⁶ .................................................. G02B 15/14
[52] U.S. Cl. .......................................... 359/696; 359/704
[58] Field of Search .................................. 359/694, 695, 359/696, 697, 698, 699, 700, 701, 823, 703, 704

[56] References Cited

U.S. PATENT DOCUMENTS

| | | | |
|---|---|---|---|
| 5,115,348 | 5/1992 | Notagashira | 359/697 |
| 5,182,674 | 1/1993 | Notagashira et al. | 359/694 |
| 5,548,446 | 8/1996 | Enomoto | 359/695 |

FOREIGN PATENT DOCUMENTS 8-094908  4/1996  Japan .

Primary Examiner—Georgia Epps
Assistant Examiner—Ricky Mack
Attorney, Agent, or Firm—Sidley & Austin

[57] ABSTRACT

Part of a shutter drive mechanism 28 which drives a shutter blade 27 extends forward in the optical axis direction from a third lens unit 33 provided with the shutter blade 17. A space 36 is provided around an adjacent second lens unit 32 to accommodate the extension of the shutter drive mechanism 28 when the lens barrel is retracted. Part of a focus drive mechanism 15 extends forward in the optical axis direction from a third lens unit 33 which is driven to focus. A space 37 is provided around the adjacent second lens unit 32 to accommodate the extension of the focus drive mechanism 15 when the lean barrel is retracted.

10 Claims, 5 Drawing Sheets

7 5 3
(26) (25) (24) CB

CB

LENS AND OPTICAL DEVICE PROVIDED WITH THE LENS

This application is based on Application No. HEI 9-97193 filed in Japan, the content of which is hereby incorporated by reference.

FIELD OF THE INVENTION

The present invention relates to a lens and optical device provided with the lens and having a movable mechanism such as a focus drive mechanism or diaphragm drive mechanism within a lens barrel.

BACKGROUND OF THE INVENTION

Conventional lenses are known which provide a diaphragm drive mechanism on the periphery of lens unit having a diaphragm, and lenses are known which provide a focus drive mechanism on the periphery of lens unit driven in focusing.

These lens drive mechanisms are drive transmission systems such as a gear train, or the like and an actuator such as a motor, and are approximately disposed on the exterior periphery of the lens unit in the diameter direction.

Such mechanisms also are used in zoom lens systems. As the number of zoom components is increased to achieve the high zoom magnification, it is necessary to increase the number of barrels fitted to be extended.

Zoom lenses become bulky, however, in conventional arrangements of focus drive mechanisms and diaphragm drive mechanisms disposed on the exterior periphery of the lens unit in the diameter direction because the dimensions in the diameter direction increase by the increase of the number of barrels in conjunction with the increase in the zoom magnification. In lenses other than zoom lenses, the compactness also is adversely affected.

SUMMARY OF THE INVENTION

An object of the present invention is to provide a more compact lens and optical device using the lens, such as a camera, video camera, digital still camera and the like.

Another object of the present invention is to provide a lens having a focus drive mechanism and/or diaphragm drive mechanism improved in its arrangement, and an optical device using the lens.

In order to achieve the aforesaid objects, one aspect of the present invention is to provide a lens having the construction described below.

A plurality of lens units including a lens unit having a diaphragm are constructed so as to move relatively in the direction of the optical axis. Part of the diaphragm drive mechanism for driving a diaphragm extends anteriorly or posteriorly along the optical axis direction from the lens unit including a diaphragm. Other lens unit adjacent to the lens unit including a diaphragm are arranged so as to provide a space around the other lens unit adjacent to the extended side of said diaphragm drive mechanism to accommodate the extended part of the diaphragm drive mechanism when the barrel is retracted.

According to the aforesaid construction, part of the diaphragm drive mechanism extends in the optical axis direction so as to reduce the extension to the exterior side in the diameter direction. The empty space between lens units in the axial direction is effectively utilized because the part of the diaphragm drive mechanism extending in the optical axis direction is accommodated during barrel retraction within the space surrounding other lens unit adjacent to the lens unit provided with a diaphragm. Furthermore, this arrangement provides a surplus margin relative to lens design such as lens spacing and lens curvature and the like.

Therefore, a zoom lens can be rendered more compact using the aforesaid construction of the diaphragm drive mechanism.

Another aspect of the present invention is to provide a lens including a lens unit driven to focus, and having the construction described below. A plurality of lens units including a lens unit driven to focus is constructed so as to move relatively along the optical axis direction. Part of the focus drive mechanism extends anteriorly or posteriorly from the lens unit driven to focus in the optical axis direction so as to accomplish the focusing operation. Other lens unit adjacent to the lens unit driven to focus are arranged so as to provide a space around the other lens unit on the extension side of the focus drive mechanism to accommodate the extended part of the focus drive mechanism when the barrel is retracted.

According to the aforesaid construction, part of the focus drive mechanism extends in the direction of the optical axis, such that the extension to the exterior side in the diameter direction is minimized. Since the extension of the focus drive mechanism is accommodated, when the barrel is retracted, within the space surrounding the other lens unit adjacent to the lens unit driven to focus, the empty space in the axial direction between the lens units is effectively utilized. Furthermore, this arrangement provides a surplus margin relative to lens design such as lens spacing and lens curvature and the like.

Therefore, a lens can be rendered more compact using the aforesaid construction of the focus drive mechanism.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1A:
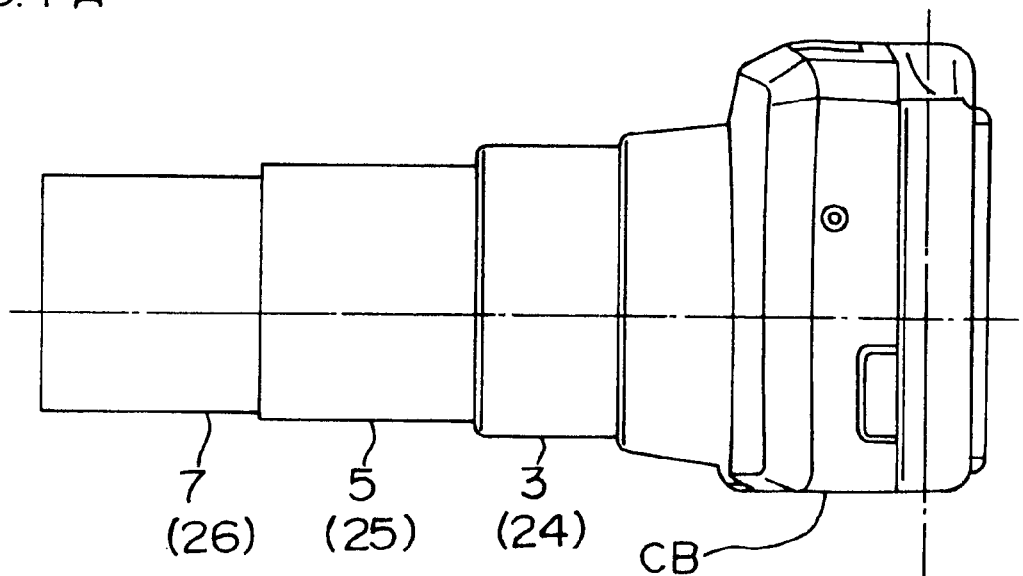
FIG. 1A shows an exterior view of a camera provided with a zoom lens set at the telephoto end position as one embodiment of the present invention.
Figure 1B:
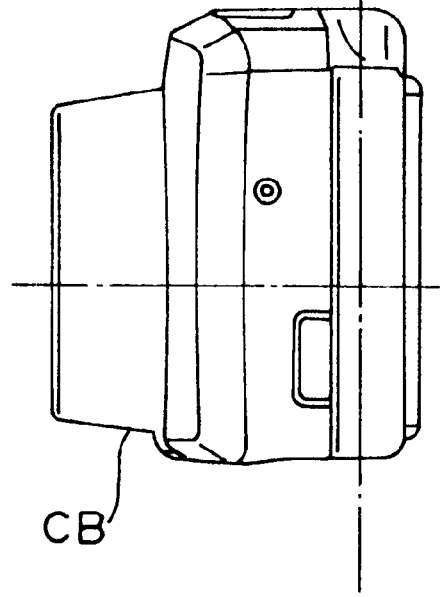
FIG. 1B shows the zoom lens in the retracted state in the camera of FIG. 1A.
Figure 2:
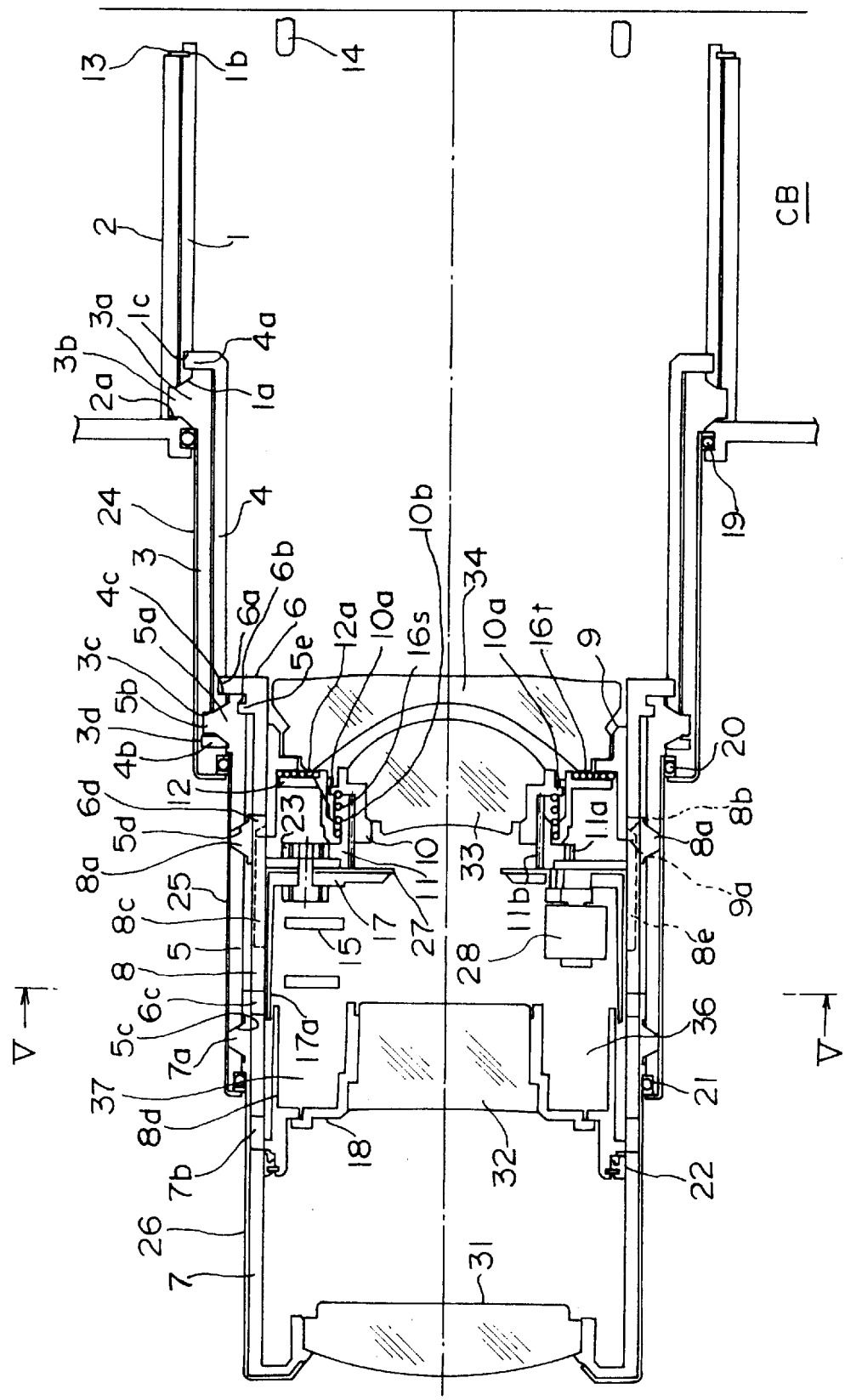
FIG. 2 is a section view showing the lens at the telephoto end.
Figure 3:
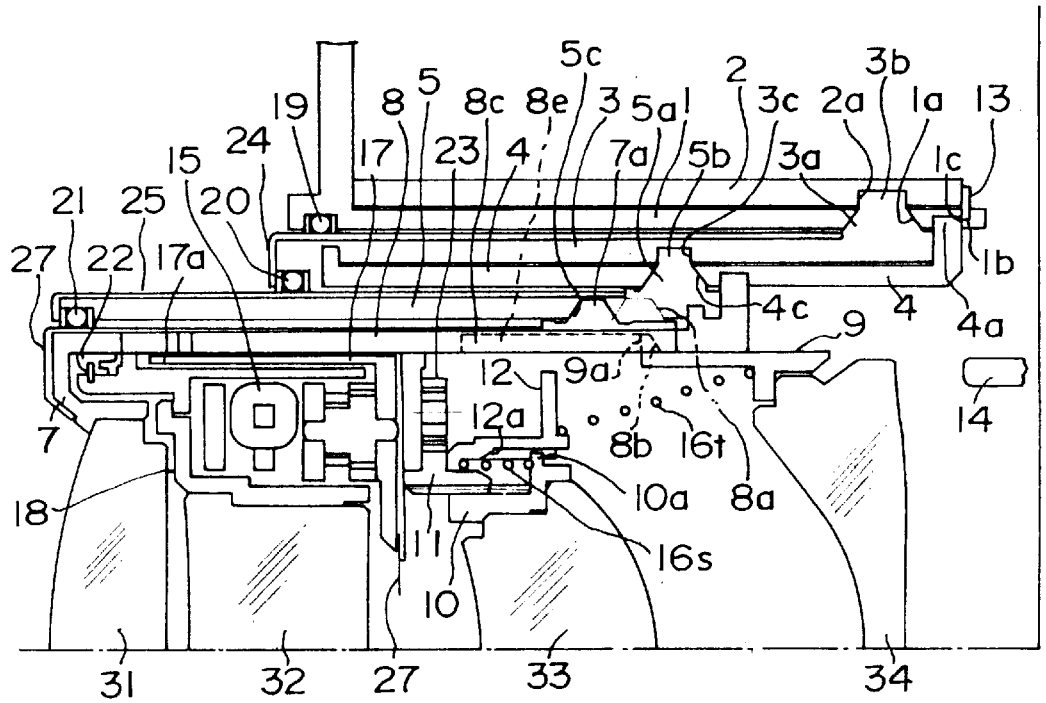
FIG. 3 is a section view of the zoom lens of FIG. 1 at the wide end.
Figure 4:
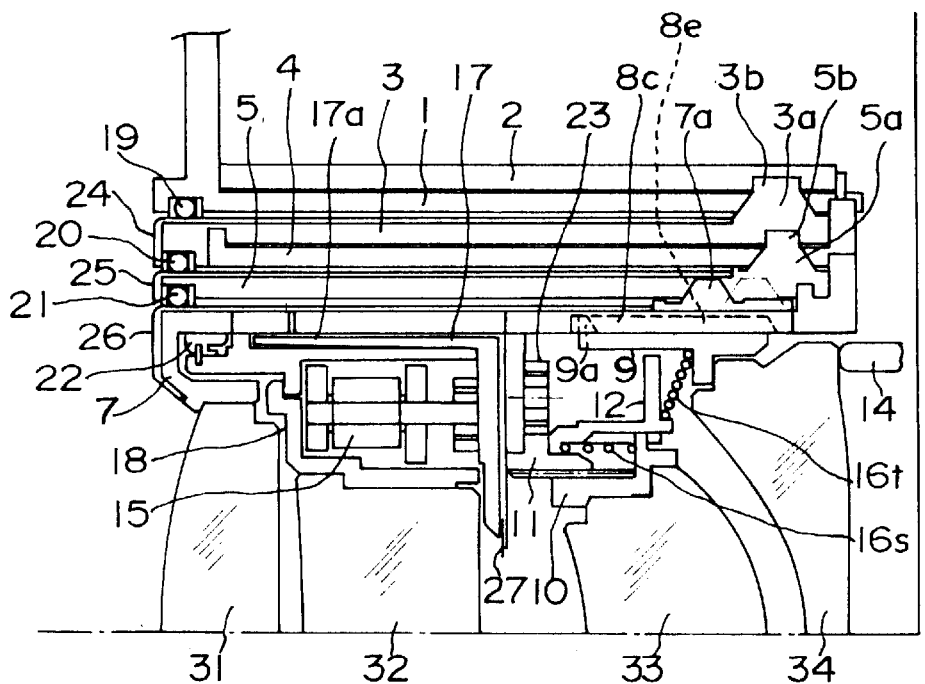
FIG. 4 is a section view of the zoom lens of FIG. 1 in a retracted state.
Figure 5:
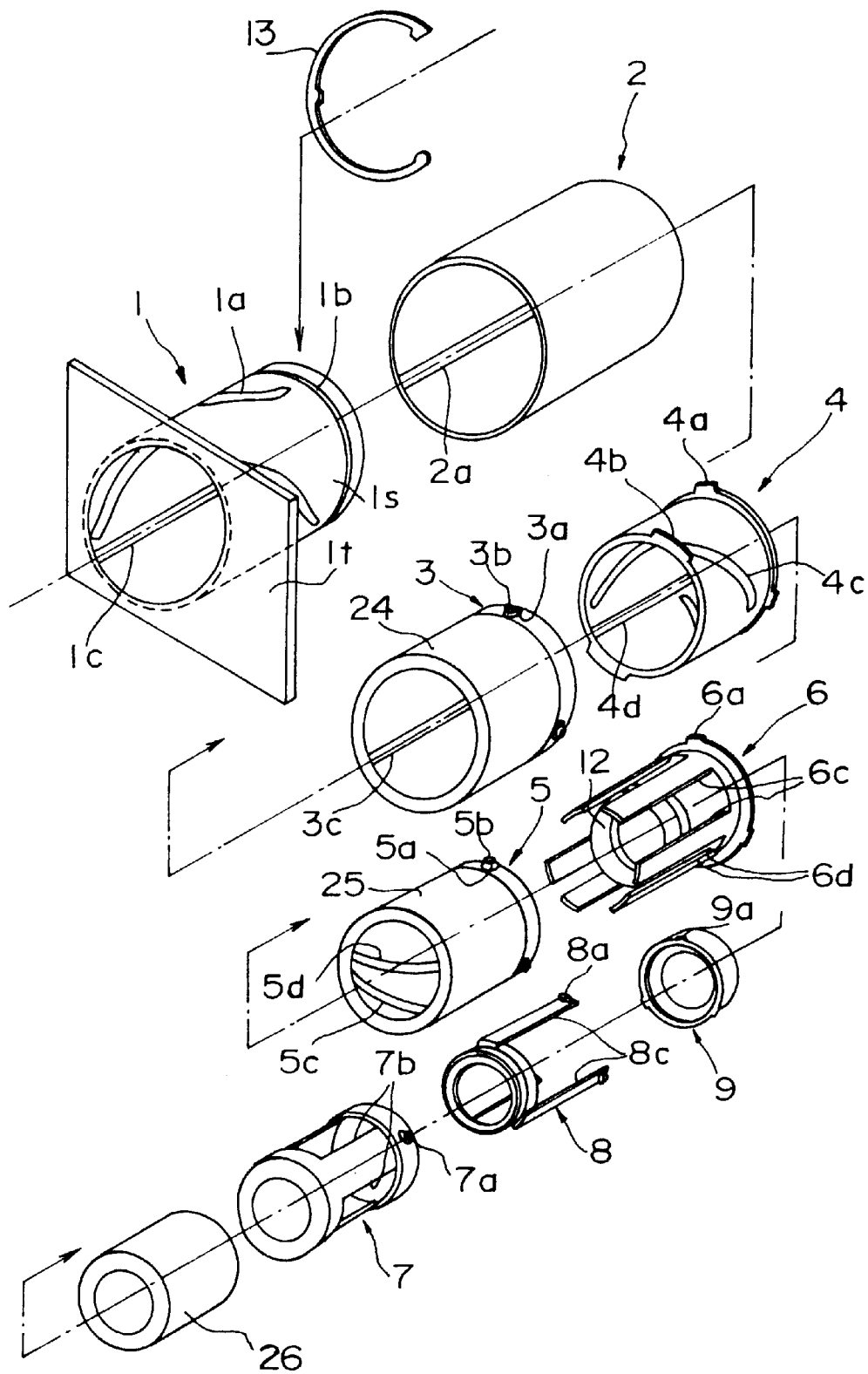
FIG. 5 is an exploded perspective view of the zoom lens of FIG. 1.
Figure 6:
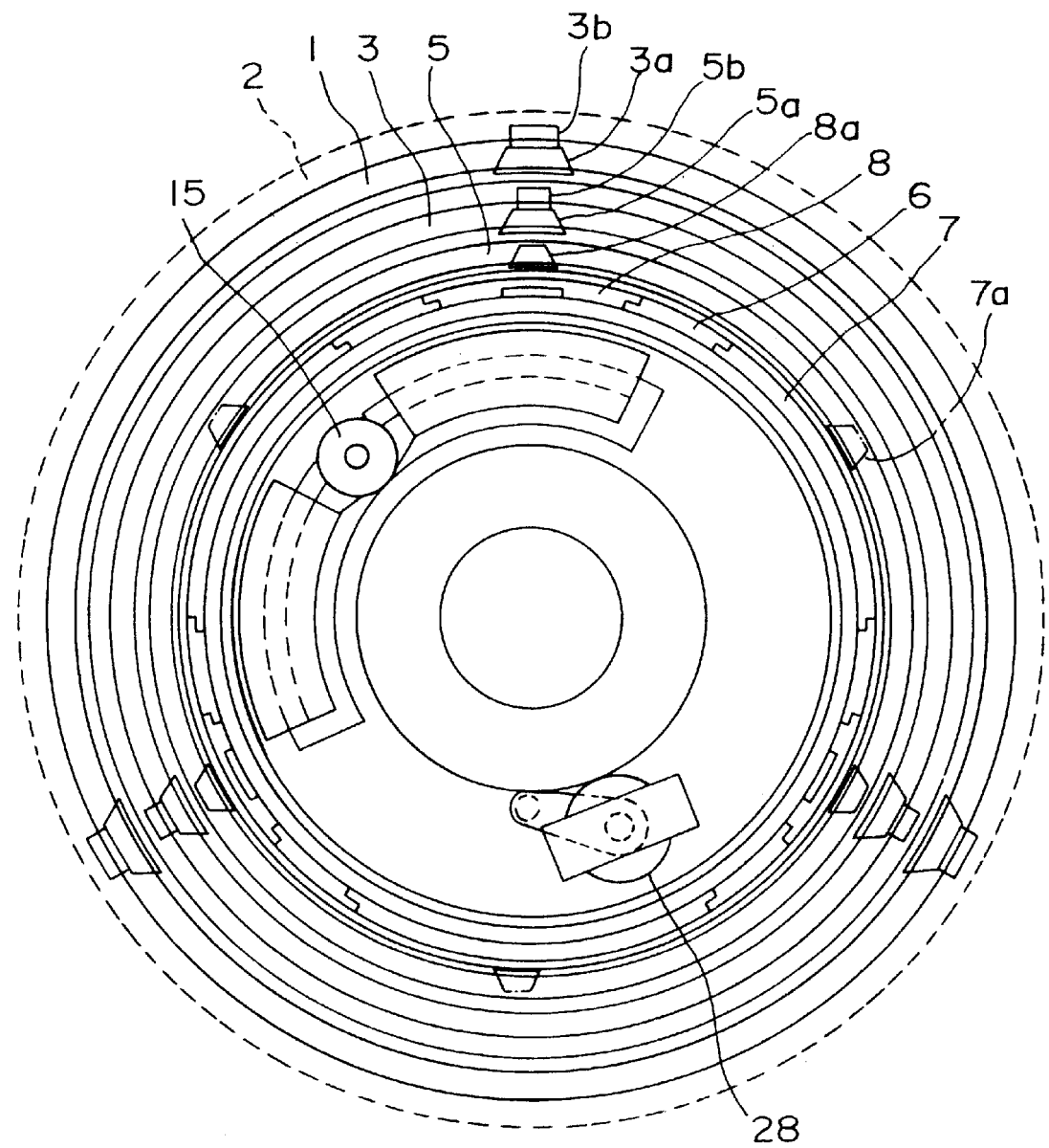
FIG. 6 is a perspective view of the zoom lens of FIG. 1 as seen from the axial direction.

The preferred embodiments of the present invention are described hereinafter with reference to FIGS. 1A–6. FIGS. 1A and 1B are exterior views of a camera provided with a zoom lens; FIG. 1A shows the lens barrel extended to the telephoto end position, and FIG. 1B shows the lens barrel in the retracted state. FIGS. 2–4 are section views of the aforesaid zoom lens; FIG. 2 shows the telephoto end state, FIG. 3 shows the wide end state, and FIG. 4 shows the retracted state. FIG. 5 is an exploded perspective view of the zoom lens. FIG. 6 is a perspective view of the zoom lens as seen from the axial direction.

First, the general construction of the camera and zoom lens are described. This zoom lens comprises four components including first through fourth lens units 31, 32, 33, 34 each of which includes one or more lenses. The lens barrel broadly comprises a stationary barrel 1 which is fixedly attached within the camera CB, zoom drive ring 2, zoom operation ring 3, direct-advance cam barrel 4, cam ring 5, direct-advance barrel 6, first lens unit holder 7, second lens unit holder 8, third lens unit lens frame 10, and fourth lens unit lens frame 9.

Stationary barrel 1 is provided with a largely cylindrical barrel wall 1s (FIG. 5), and a flange 1t (FIG. 5) connected to the front edge of said barrel wall 1s, and said flange 1t is fixedly attached to the camera body. Stationary barrel 1 is provided with a spiral shaped cam channel 1a formed through the barrel wall 1s, and an interlocking channel 1b extends around the circumference at the back edge of the exterior surface, and a direct advance channel 1c extends on the interior surface in the axial direction.

Zoom drive ring 2 fits over stationary barrel 1 so as to be supported in free rotation by a stop ring 13 connected to flange 1t of stationary barrel 1 and interlocking channel 1b of stationary barrel 1. The interior surface of zoom drive ring 2 is provided with a direct advance channel 2a extending in the axial direction.

Zoom operation ring 3 is disposed on the interior side of stationary barrel 1, so as to emerge from stationary barrel 1. That is, zoom operation ring 3 has integratedly on the back edge of the exterior surface thereof a cam follower 3a which engages the cam channel 1a of stationary barrel 1, and a direct advance pin 3b which engages the direct advance channel 2a of zoom drive ring 2, such that when the zoom drive ring 2 is rotated relative to the stationary barrel 1, the zoom operation ring 3 moves in the axial direction while rotating in conjunction with zoom drive ring 2 relative to stationary barrel 1. A direct advance channel 3c extending in the axial direction is formed on the interior surface of zoom operation ring 3, and a bayonet channel 3d extending in the circumferential direction is formed at the anterior edge interior surface of zoom operation ring 3.

Direct advance cam barrel 4 is disposed on the interior side of zoom operation ring 3, so as to move in the axial direction integratedly with said zoom operation ring 3. That is, the anterior edge of direct advance cam barrel 4 is provided with a bayonet member 4b which extends toward the exterior side in the diameter direction to engage the bayonet channel 3d of zoom operation ring 3, so as to form a bayonet coupling to the zoom operation ring 3. The posterior edge of direct advance barrel 4 has a direct advance guide 4a extending in the diameter direction to engage the direct advance channel 1c of stationary barrel 1, so as to move in the axial direction without rotation relative to stationary barrel 1. The direct advance cam barrel 4 is provided with a spiral-shaped cam channel 4c formed through the barrel wall, and a direct advance channel 4d extending in the axial direction is formed on the interior surface thereof.

Cam ring 5 is disposed on the interior side of direct advance cam barrel 4, so as to emerge from direct advance cam barrel 4 via the relative rotations of direct advance cam barrel 4 and zoom operation ring 3. That is, cam ring 5 has integrated on the posterior edge thereof a cam follower 5a which engages the cam channel 4c of direct advance cam barrel 4, and a direct advance pin 5b which engages the direct advance channel 3a of zoom operation ring 3, so as to move in the axial direction while rotating via the relative rotations of the direct advance cam barrel 4 and zoom operation ring 3. Two types of spiral-shaped cam channels 5c and 5d are formed on the interior surface of cam ring 5. A bayonet channel 5e is formed on the posterior edge of the interior surface of cam ring 5.

Direct advance barrel 6 is disposed on the interior side of cam ring 5, so as to move integratedly with said cam ring 5 in the axial direction. That is, the posterior edge of direct advance barrel 6 is provided with a bayonet member 6b to engage the bayonet channel 5e of cam ring 5, and a direct advance guide 6a to engage the direct advance channel 4d of direct advance cam barrel 4, both of which respectively extend toward the exterior side in the diameter direction, so as to move in the axial direction together with cam ring 5 without rotation. The barrel wall of direct advance barrel 6 is notched in the axial direction from the anterior side to form a comb-tooth shape, such that two types of direct advance guides 6c and 6d are formed by each notched channel of the side surface extending in the axial direction. The third lens unit 33 driven to focus is held on the interior of direct advance barrel 6.

More specifically, a focus baseplate 12 is provided within direct advance barrel 6. On the anterior side of focus baseplate 12 are fixedly attached a shutter blades 27 which serve both as a shutter and aperture diaphragm, shutter/diaphragm drive mechanism 28, focus drive mechanism 15, and shutter blade presser 17. A focus drive ring 11, which is approximately ring-shaped, is supported so as to be freely rotatably on the interior side of focus baseplate 12. A gear 11a is formed on the exterior surface of focus drive ring 11, and engages the output gear 23 connected to the focus drive mechanism 15. A helicoid 11b is formed on the interior surface of focus drive ring 11. A third lens unit lens frame 10 for holding the third lens unit 33 is disposed on the interior side of focus drive ring 11. The exterior surface of the third lens unit lens frame 10 is provided with a helicoid 10b so as to connect via a helicoid coupling with helicoid 11b of focus drive ring 11. A direct advance guide 10a extending to the exterior side in the diameter direction extends from the anterior edge of the third lens unit lens holder 10, and engages the direct advance guide channel 12a formed on the interior surface of focus baseplate 12 to guide the advance and regulate rotation. A compression spring 16s is arranged in the axial direction in direct advance guide channel 12a, and normally exerts a force on the third lens unit lens frame 10 backward in the optical axis direction, so as to connect the third lens unit lens frame 10 and the focus drive ring 11 without looseness via a helicoid coupling. When the focus drive mechanism 15 is actuated to rotate the output gear 23 and rotate the focus drive ring 11, the third lens unit lens frame 10 travels in helicoid manner in the direction of the optical axis so as to adjust the focus of the zoom lens.

The first lens unit holder 7 is disposed on the interior side of cam ring 5, and is driven in advance by the relative rotation of cam ring 5 and direct advance barrel 6. That is, a cam follower 7a for engaging the first cam channel 5c of cam ring 5 extends from the anterior edge of the first lens unit holder 7 toward the exterior in the diameter direction. A channel extending from the anterior side to the front side in the direction of the optical axis is notched in the barrel wall of the first lens unit holder 7, and a sub-guide 7b for engaging the direct advance guide 6c of the direct advance barrel 6 is formed on the side surface thereof and extends in the optical axis direction of the channel.

Similar to the first lens unit holder 7, the second lens unit holder 8 is disposed on the interior side of cam ring 5 and is driven in advance via the relative rotation of cam ring 5 and direct advance barrel 6. The second lens unit holder 8 is disposed on the posterior side of the first lens unit holder 7. The posterior edge of the second lens unit holder 8 has a cam follower 8a extending therefrom toward the exterior side diameter direction to engage the second cam channel 5d of cam ring 5. The barrel wall of the second lens unit holder 8 is notched to provide a channel extending from the posterior side to the anterior side in the optical axis direction, and a guided portion 8c for engaging the direct advance guide 6d of the direct advance barrel 6 is formed on the side surface thereof and extends in the optical axis direction of the channel. The second lens unit holder 8 is provided with a coupling channel 8e extending in the axial direction formed on the interior surface of the barrel wall, and the anterior edge of said barrel wall engages the second lens unit lens frame body 18 which holds the second lens unit 32.

The fourth lens unit lens frame 9 is disposed on the interior side of the second lens unit holder 8 and is supported by the second lens unit holder 8. A projection 9a extends from the exterior surface of the fourth lens unit lens frame 9 to engage the coupling channel 8e of the second lens unit holder 8. A circular cone compression spring 16t is arranged in the axial direction between the fourth lens unit lens frame 9 and the focus baseplate 12, and exerts a force on the fourth lens unit lens frame 9 toward the posterior side in the optical axis direction. When the lens barrel is extended to usable state, the projection 9a of the fourth lens unit lens frame 9 is pressed in contact with the posterior edge 8b of coupling channel 8e of the second lens unit 8, and the fourth lens unit 34 of the fourth lens unit lens frame 9 is driven so as to be linked with the second lens unit 32 of the second lens unit holder 8 while maintaining a constant distance therebetween. The posterior edge 8b of coupling channel 8e of the second lens unit holder 8 and the inclined surface of the posterior edge of projection 9a of the fourth lens unit lens frame 9 are circular cones of identical apex angle with the optical axis as a symmetrical rotational axis. Therefore, the fourth lens unit lens frame 9 receives an aligning action so as to have the same axis as the second lens unit holder 8 while being supported by said second lens unit holder 8.

A stopper 14 extends into the interior of the camera CB. Stopper 14 extends from rear side toward the posterior edge of the zoom lens, so as to abut the fourth lens unit lens frame 9 and stop the movement of said fourth lens unit lens frame 9 backward in the axial direction when the lens barrel is retracted. Therefore, when the lens barrel is retracted, only the second lens unit holder 8 moves back in the axial direction and approaches the fourth lens unit lens frame 9 so as to release the projection 9a of the fourth lens unit lens frame 9 from the posterior edge 8b of the coupling channel 8e of the second lens unit holder 8, charging the compression spring 16t and entering the retracted state shown in FIG. 3.

Collars 24, 25, and 26 are pressure fitted on the exteriors of zoom operation ring 3, cam ring 5, and first lens unit holder 7, respectively. Rubber ring light seals 19, 20 and 21 are fixedly attached to the interior side anterior edge of stationary barrel 1, zoom operation ring 3, and cam ring 5, respectively, so as to seal out light between the barrels 1, 3, and 5, and the collars 24, 25, and 26. A rubber light seal 22 is fixedly attached to the anterior edge of the second lens unit holder 8, so as to press against the interior wall of the first lens unit holder 7, and seal out light between the first lens unit holder 7 and the second lens unit holder 8. Light is sealed out between the second lens unit 32 and the third lens unit 33 by maintaining the mutual centering location relationship of rings 17a and 18d extending from shutter blade presser 17 and second lens unit holder 8 even during the zooming operation.

The zooming operation is described below with reference to FIGS. 1A–4. When the zoom motor within camera CB rotates from the wide state of FIG. 3 or the retracted state of FIGS. 1B and 4, the rotational force is transmitted zoom drive barrel 2 via a reduction system not illustrated. Since the direct advance pin 3b and cam follower 3a are respectively connected to the direct advance channel 2a of zoom drive barrel 2 and cam channel 1a of stationary barrel 1, respectively, when the aforesaid rotational force is transmitted to the zoom drive barrel 2 and said barrel 2 rotates, the zoom drive ring 3 is rotated relative to stationary barrel 1 and advances in the optical axis direction.

The bayonet member 4b of direct advance cam barrel 4 is coupled to the bayonet channel 3d of the zoom operation ring 3, and the direct advance guide 4a of direct advance cam barrel 4 engages the direct advance channel 1c of stationary barrel 1, such that the direct advance cam barrel 4 advances together with the zoom operation ring 3 in the optical axis direction in conjunction with the rotation and advance of the zoom operation ring 3 in the optical axis direction.

Since the cam follower 5a of cam ring 5 engages the cam channel 4c of direct advance cam barrel 4 and the direct advance pin 5b of cam ring 5 engages the direct advance channel 3c of zoom operation ring 3, when the direct advance cam barrel 4 and zoom operation ring 3 rotate relatively, the cam ring 5 advances in the optical axis direction in conjunction with the rotation of the direct advance cam barrel 4 and the zoom operation ring 3.

Since the bayonet member 6b of direct advance barrel 6 engages the bayonet channel 5e of cam ring 5 and the direct advance guide 6a of direct advance barrel 6 engages the direct advance channel 4d of direct advance cam barrel 4, the direct advance barrel 6 advances together with the cam ring 5. Since the third lens unit lens frame 19 is fixedly attached to the direct advance barrel 6, the third lens unit 33 is moved together with the direct advance barrel 6.

Since the cam follower 7a of the first lens unit holder 7 engages the cam channel 5c of cam ring 5 and the guided portion 7b engages the direct advance guide 6c of direct advance barrel 6, the first lens unit holder 7 is driven to advance by the relative rotations of the cam ring 5 and direct advance barrel 6. The first lens unit holder 7 moves together with the first lens unit holder 7 because the first lens unit 31 is held by said first lens unit holder 7.

Since the cam follower 8a of the second lens unit holder 8 engages the cam channel 5d of cam ring 5 and the guided portion 8c engages the second direct advance guide 6d of direct advance barrel 6, the second lens unit holder 8 is driven to advance via the relative rotations of cam ring 5 and direct advance barrel 6. The second lens unit 32 is moved together with the second lens unit holder 8 because the second lens unit lens frame 18 is fixedly attached to the second lens unit holder 8.

The projection 9a of fourth lens unit lens frame 9 is pressed against the posterior edge 8b of coupling channel 8e of the second lens unit 8 via the force exerted by the compression spring 16s, such that the fourth lens unit lens frame 9 is driven in linkage with the second lens unit holder 9 while maintaining a constant spacing therebetween. Accordingly, the fourth lens unit 34 is moved together with the second lens unit while maintaining a constant spacing therebetween.

When not being used in photography (i.e., when being carried), this zoom lens is so constructed that the various lens units 31, 32, 33, and 34 can be moved from the wide state shown in FIG. 3 to the compact retracted state shown in FIG. 4 (FIG. 1B), so as to reduce the overall length of the camera, and when the zoom lens moves from the retracted position to the wide position, and from the wide position to the telephoto position shown in FIG. 2 (FIG. 1A), the previously mentioned operations are repeated consecutively.

The focusing operation is described below. When the stepping motor (the stator is shown in cross section in FIG. 2, the coil is shown in section view in FIG. 3, and the rotor is shown in cross section FIG. 4) used as the actuator for focus drive mechanism 15 is actuated, output gear 23 is rotated via a gear reduction system not shown in the drawing, and the rotational force is transmitted to focus ring 11. When focus ring 11 is rotated, the helicoid 10b on the exterior surface of the third lens unit lens frame 10 engages the helicoid 11b on the interior surface of focus ring 11, and the direct advance guide 10a of third lens unit lens frame 10 engages the direct advance guide channel 12a of focus baseplate 12, such that the third lens unit lens frame 10 is advanced in the optical axis direction without rotation relative to direct advance barrel 6.

The zooming and focusing operations are approximately as described above, and are described in greater detail below relative to the characteristics of the present embodiment.

A first characteristics is that the diaphragm drive mechanism and focus drive mechanism extend in the optical axis direction.

As shown in FIGS. 2 and 6, part of the shutter/diaphragm drive mechanism 28 which drives the shutter blades (diaphragm) 27, i.e., the iris motor, extends forward in the optical axis direction from the third lens unit 33 provided with the shutter blades 27. A space 36 is provided around the second lens unit 32 adjacent to the extension side of the shutter/diaphragm drive mechanism 28 to accommodate said extension part of shutter/diaphragm drive mechanism 28 when retracted.

A part of the focus drive mechanism 15, i.e., a stepping motor, extends forward in the optical axis direction from the third lens unit 33 which is driven to focus. A space 37 is provided around the second lens unit 32 on the extension side of the focus drive mechanism 15 to accommodate said extension part of the focus drive mechanism 15 when retracted.

Accordingly, the extensions are minimized to the exterior side in the diameter direction by extending parts of the diaphragm drive mechanism and focus drive mechanism in the direction of the optical axis. Furthermore, the empty space in the axial direction between lens units is effectively utilized since the part extended in the optical axis direction is accommodated within spaces 36 and 37 around the adjacent second lens unit 32 when retracted. Therefore, this arrangement provides a surplus margin relative to lens design such as lens spacing and lens curvature and the like, and provides a more compact zoom lens.

A second characteristic is that spring force and the abutment of circular cone surfaces are used to support and align the second lens unit holder 8 and fourth lens unit lens frame 9.

That is, the second lens unit holder 8 and fourth lens unit lens frame 9 are force in reciprocal direction along the optical axis direction via the compression spring 16t. The posterior edge 8b of coupling channel 8e of second lens unit holder 8 is provided with a circular cone-shaped concave surface with the optical axis set as a symmetrical rotational axis, and the posterior side of projection 9a of fourth lens unit lens frame 9 is provided with a circular cone-like convex surface having an apex angle identical to the optical axis set as the symmetrical rotational axis, such that these concave and convex surfaces are mutually brought into pressure contact via the force exerted by compression spring 16t. Therefore, when extended to the usable state, these circular cone surfaces are aligned with identical axes, such that an aligning action works on the fourth lens unit lens frame 9 relative to the second lens unit holder 8, the second and fourth lens units 32 and 34 have mutually matching optical axes, and there is no eccentric condition. Accordingly, the eccentric precision of the fourth lens unit 34 supported via the second lens unit holder 8 is identical to the eccentric precision of the second lens unit 32.

When retracted, on the other hand, the most posterior fourth lens unit lens frame 9 abuts the stopper 14, and the second lens unit holder 8 approaches the fourth lens unit lens frame 9 against the force exerted by compression spring 16t. Therefore, the zoom lens achieves shorter dimensions in the axial direction when retracted.

A third characteristics is that the mechanisms within the direct advance guides of the first and second lens units are so constructed as to not increase the dimensions in the posterior direction.

The first and second lens units 31 and 32, which have displacement relative to the stationary barrel 1 in the optical axis direction greater than the third lens unit 33, are disposed anteriorly to the first lens unit 33. A plurality of direct advance guides 6c and 6d extending forward in the optical axis direction are provided on the direct advance barrel 6 which supports the third lens unit 33. Guided portions 7b and 8c extending in the optical axis direction are respectively provided on the lens unit holders 7 and 8 which support the first and second lens units 31 and 32, said placement being at diameter positions identical to those of direct advance guides 6c and 6d of direct advance barrel 6. The direct advance guides 6c and 6d and the guided portions 7b and 8c are positioned such that their tips are mutually engaged when the lens barrel is extended, and said direct advance guides 6c and 6d and the guided portions 7b and 8c are mutually overlapped when the lens barrel is retracted, thereby accomplishing expansion and contraction of the zoom lens. Enlargement of the dimensions in the diameter direction is prevented because the direct advance guides 6c and 6d and the guided portions 7b and 8c are provided a identical diameter positions. Accordingly, the lens barrel diameter is not increased even when the zoom lens comprises more than four components.

Although the previously described embodiment has been described in terms of a camera provided with a zoom lens, it is to be noted that the present invention can provide lenses other than zoom lenses more compact. The present invention is also applicable to an interchangeable lens. The present invention is further applicable to other optical devices such as video cameras, digital still cameras, telescopes and binoculars.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An optical device comprising:

a plurality of lens units, one of said plurality of lens units comprising an aperture diaphragm and an open/close mechanism for driving said aperture diaphragm; and a driving mechanism for driving said plurality of lens units to achieve relative movement of said plurality of lens units, wherein a part of said open/close mechanism projects in a direction along an optical axis of said plurality of lens units, and another one of said plurality of lens units, adjacent to said one of the plurality of lens units, forms a space in an outer circumference of a lens in said another one of the plurality of lens units for receiving therein said part of the open/close mechanism.

2. An optical device according to claim 1, wherein said plurality of lens units carries out a zooming operation by moving at least one of said plurality of lens units with respect to at least one other of said plurality of lens units.

3. An optical device according to claim 1, wherein said part of the open/close mechanism includes a motor for driving said aperture diaphragm.

4. An optical device according to claim 1, wherein said aperture diaphragm functions as a shutter.

5. An optical device comprising:

a plurality of lens units, one of said plurality of lens units comprising a focusing mechanism which drives said one of the plurality of lens units for focusing; and a driving mechanism for driving said plurality of lens units to achieve relative movement of said plurality of lens units;

wherein a part of said focusing mechanism projects in a direction along an optical axis of said plurality of lens units, and another one of said plurality of lens units, adjacent to said one of the plurality of lens units, forms a space in an outer circumference of a lens in said another one of the plurality of lens units for receiving therein said part of the focusing mechanism.

6. An optical device according to claim 5, wherein said plurality of lens units carries out a zooming operation by moving at least one of said plurality of lens units with respect to at least one other of said plurality of lens units.

7. An optical device according to claim 5, wherein said part of the focusing mechanism includes a motor for driving said one of the lens units.

8. An optical device comprising:

a plurality of lens units, one of said plurality of lens units for holding a first driving mechanism; and a second driving mechanism for driving said plurality of lens units to achieve relative movement of said plurality of lens units, wherein a part of said first driving mechanism projects in a direction along an optical axis of said plurality of lens units, and another one of said plurality of lens units, adjacent to said one of the plurality of lens units, forms a space in an outer circumference of a lens in said another one of the plurality of lens units for receiving therein said first driving mechanism.

9. An optical device according to claim 8, wherein said plurality of lens units carries out a zooming operation by moving at least one of siad plurality of lens units with respect to at least one other of said plurality of lens units.

10. An optical device according to claim 8, wherein said part of the first driving mechanism includes a motor.

* * * * *